(12) United States Patent
Yajima et al.

(10) Patent No.: US 10,530,003 B2
(45) Date of Patent: Jan. 7, 2020

(54) SOLID OXIDE FUEL CELL

(71) Applicant: NISSAN MOTOR CO., LTD., Yokohama-shi, Kanagawa (JP)

(72) Inventors: Kentarou Yajima, Kanagawa (JP); Masanari Yanagisawa, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/083,761

(22) PCT Filed: Nov. 8, 2016

(86) PCT No.: PCT/JP2016/083030
§ 371 (c)(1),
(2) Date: Sep. 10, 2018

(87) PCT Pub. No.: WO2017/154265
PCT Pub. Date: Sep. 14, 2017

(65) Prior Publication Data
US 2019/0036144 A1    Jan. 31, 2019

(30) Foreign Application Priority Data

Mar. 11, 2016  (JP) ................................ 2016-048357

(51) Int. Cl.
*H01M 8/1233* (2016.01)
*H01M 8/0206* (2016.01)
(Continued)

(52) U.S. Cl.
CPC ....... *H01M 8/1233* (2013.01); *H01M 8/0206* (2013.01); *H01M 8/0232* (2013.01);
(Continued)

(58) Field of Classification Search
CPC .................................. H01M 8/12; H01M 8/02
See application file for complete search history.

(56) References Cited

U.S. PATENT DOCUMENTS

| 2007/0172717 | A1 | 7/2007 | Chang et al. |
| 2008/0152983 | A1 | 6/2008 | Horiuchi et al. |
| | | (Continued) | |

FOREIGN PATENT DOCUMENTS

| DE | 42 37 602 A1 | 5/1994 |
| DE | 10317388 A1 | 11/2004 |
| | (Continued) | |

*Primary Examiner* — James Lee
(74) *Attorney, Agent, or Firm* — Foley & Lardner LLP

(57) ABSTRACT

A solid oxide fuel cell of the present invention includes: a fuel cell unit including a fuel electrode, a solid electrolyte and an air electrode layered in the written order; a current collection assisting layer that is layered on an air electrode side of the fuel cell unit; air channels disposed on the air electrode side; and fuel gas channels disposed on a fuel electrode side. The air channels and the fuel gas channels are defined and formed by a current collector on the current collection assisting layer and a current collector on the fuel electrode side of the fuel cell unit. The air channels and the fuel gas channels extend in the same direction that is perpendicular to the fuel cell unit layering direction. The current collector on the air electrode side is fixed to the current collection assisting layer at first fixing portions that extend in the air channel extending direction, and the current collector on the fuel electrode side is fixed to the fuel electrode side of the fuel cell unit at second fixing portions that extend in the fuel gas channel extending direction. The solid oxide fuel cell is characterized in that the current collection assisting layer has such flexural rigidity that is lower in a direction perpendicular to the air channel extending direction than in the air channel extending direction.

16 Claims, 11 Drawing Sheets

(51) Int. Cl.
*H01M 8/0232* (2016.01)
*H01M 8/2432* (2016.01)
*H01M 8/0273* (2016.01)
*H01M 8/124* (2016.01)

(52) U.S. Cl.
CPC ....... *H01M 8/0273* (2013.01); *H01M 8/2432* (2016.02); *H01M 2008/1293* (2013.01)

(56) References Cited

U.S. PATENT DOCUMENTS

| | | | | |
|---|---|---|---|---|
| 2009/0023048 A1* | 1/2009 | Ohmori | ............... | H01M 8/0232 |
| | | | | 429/434 |
| 2012/0164552 A1* | 6/2012 | Kobayashi | ............ | H01M 4/861 |
| | | | | 429/480 |

FOREIGN PATENT DOCUMENTS

| | | |
|---|---|---|
| JP | 2006-310104 | 11/2006 |
| JP | 3130802 U | 4/2007 |
| JP | 2008-159448 A | 7/2008 |
| JP | 2008-243153 A | 10/2008 |
| JP | 2008-243513 A | 10/2008 |
| JP | 2009-043709 A | 2/2009 |
| JP | 2009-212046 A | 9/2009 |
| JP | 2009-218172 A | 9/2009 |
| JP | 2010-067401 A | 3/2010 |
| JP | 2015-088320 | 5/2015 |

* cited by examiner

SOLID OXIDE FUEL CELL

TECHNICAL FIELD

The present invention relates to a solid oxide fuel cell, in more detail a solid oxide fuel cell in which increase in electric resistance due to a breakage of contact is prevented.

BACKGROUND ART

In recent years, fuel cells have drawn attention as an eco-friendly clean energy source that has high power generation efficiency and produces little harmful gas.

A solid oxide fuel cell (hereinafter also referred to simply as an "SOFC"), which is a type of fuel cells, comprises a fuel cell unit and current collectors, in which the fuel cell unit comprises a solid oxide electrolyte layer, a gas-permeable air electrode (cathode) and a gas-permeable fuel electrode (anode).

The solid oxide electrolyte layer serves as a partition wall, and electric power is generated when fuel gas such as hydrogen and hydrocarbon is supplied to the fuel electrode and oxygen-containing gas such as air is supplied to the other electrode, i.e. the air electrode.

The current collectors contact the fuel cell unit to collect charges of the fuel cell unit. The current collectors also form a fuel gas channel or an air channel between the current collectors and the fuel cell unit.

The air electrode of the fuel cell unit is made of a metal oxide that has higher electric resistance than metals.

Accordingly, a longer travel distance of charges in the air electrode results in decreased power generation efficiency. To avoid this, a current collection assisting layer is provided between the air electrode and the current collector to form a conductive path so as to reduce the electric resistance.

JP 2008-243513A or Patent Document 1 discloses a fuel cell stack in which a metal porous body such as an expanded metal is disposed between a carbon bipolar plate defining a gas channel and a membrane-electrode assembly.

CITATION LIST

Patent Document

Patent Document 1: JP 2008-243513A

SUMMARY OF INVENTION

Technical Problem

However, the operation temperature of solid oxide fuel cells is high. In order to reduce the start-up time from a cold state, a high-temperature gas is supplied to the gas channel to rapidly raise the temperature. However, this causes a large temperature difference between the fuel cell unit and the like and a case, which results in a large difference in thermal expansion between the fuel cell unit and the like and the case.

Since the periphery of the fuel cell unit is restrained by the case, the fuel cell unit cannot expand outward even when it extends by thermal expansion. As a result, such thermal expansion-induced extension is absorbed as a flexural deformation of the fuel cell unit.

That is, when thermal expansion-induced extension is restricted, the fuel cell unit in which a fuel electrode, an air electrode and a solid oxide electrolyte layer are laminated is likely to cause a large flexural deformation since the materials constituting them, such as metal particles and oxide particles, are dense.

In contrast, the current collection assisting layer, which is disposed between the air electrode of the fuel cell unit and the current collector to form the conductive path from the air electrode to the current collector, is sparser than the fuel cell unit since it has a lot of large pores for supplying air in the air channel to the air electrode.

This means the pores can absorb expansion even when extension of the current collection assisting layer as a whole is restricted. Therefore, thermal expansion-induced extension of wires and the like of the current collection assisting layer is less likely to cause flexural deformation of the current collection assisting layer itself.

In solid oxide fuel cells, current collectors that define and form air channels and fuel channels, respectively, are fixed to the current collection assisting layer and the fuel cell unit in the extending direction of the air channels or the fuel channels as illustrated in FIG. 1 or FIG. 2.

This restricts flexural deformation of the air channels or the fuel channels in their extending directions. Therefore, flexural deformation of the fuel cell unit is likely to occur in the direction perpendicular to the extending direction of the air channels or the fuel channels.

When extension in the plane direction of the fuel cell unit is restricted as described above, the current collection assisting layer cannot follow a thermal expansion-induced flexural deformation of the fuel cell unit, in case the current collection assisting layer has high flexural rigidity. As a result, a contact between the current collection assisting layer and the fuel cell unit is broken in the direction perpendicular to the air channel extending direction as illustrated in FIG. 3, which increases the electric resistance.

The present invention has been made in view of the above-described problem in the prior art, and an object thereof is to provide a solid oxide fuel cell that does not suffer from breakage of contact between an current collection assisting layer and an air electrode even when the fuel cell unit curves due to a difference in thermal expansion or the like, which can prevent an increase in electric resistance.

Solution to Problem

As a result of keen study in order to achieve the above-described object, the present inventors found that it is possible to prevent breakage of contact between the current collection assisting layer and the air electrode as well as to obtain an effect of reducing the electric resistance of the current collection assisting layer by configuring the current collection assisting layer of the solid oxide fuel cell to have such flexural rigidity that is smaller in a direction perpendicular to the gas channel direction than in the gas channel direction.

That is, the solid oxide fuel cell of the present invention comprises: a fuel cell unit comprising a fuel electrode, a solid electrolyte and an air electrode layered in the written order; a current collection assisting layer that is layered on an air electrode side of the fuel cell unit; air channels disposed on the air electrode side; and fuel gas channels disposed on a fuel electrode side. The air channels and the fuel gas channels are defined and formed by a current collector on the current collection assisting layer and a current collector on the fuel electrode side of the fuel cell unit. The air channels and the fuel gas channels extend in the same direction that is perpendicular to the fuel cell unit layering direction. The current collector on the air electrode side is fixed to the current collection assisting layer at first fixing portions that extend in the air channel extending direction, and the current collector on the fuel electrode side is fixed to the fuel electrode side of the fuel cell unit at second fixing portions that extend in the fuel gas channel extending direction.

The solid oxide fuel cell is characterized in that the current collection assisting layer has such flexural rigidity that is lower in a direction perpendicular to the air channel extending direction than in the air channel extending direction.

Advantageous Effects of Invention

In the present invention, the solid oxide fuel cell comprises the current collection assisting layer having such flexural rigidity that is less in a direction perpendicular to the gas channel extending direction than in the gas channel extending direction. This allows the current collection assisting layer to follow flexural deformation of the fuel cell unit, and it is therefore possible to prevent separation of the current collection assisting layer and to prevent an increase in electric resistance.

DESCRIPTION OF EMBODIMENTS

Figure 4:
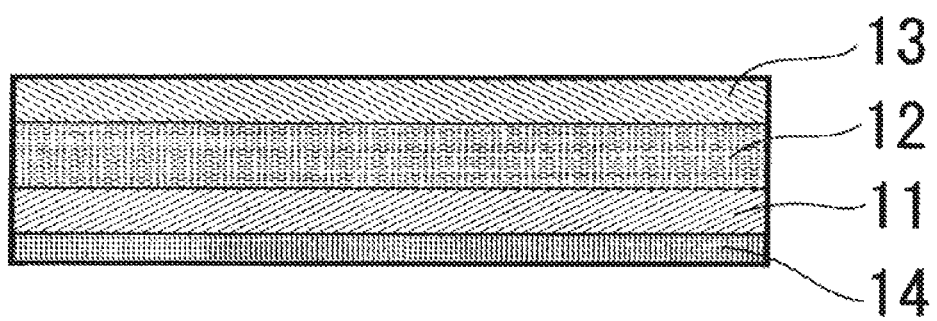
FIG. 4 illustrates an example of the layer configuration of a fuel cell unit.

The solid oxide fuel cell of the present invention will be described in detail. The solid oxide fuel cell C comprises a fuel cell unit 1, a current collection assisting layer 2 and a current collector 3. As illustrated in FIG. 4, the fuel cell unit comprises a fuel electrode 11, a solid electrolyte layer 12 and an air electrode 13 that are layered in the written order and supported by a porous metal support 14.

The fuel cell unit in the following description is an example of a metal-supported cell (MSC) in which the fuel electrode 11, the solid electrolyte layer 12 and the air electrode 13 are supported by the porous metal support 14. However, the solid oxide fuel cell of the present invention may be any of an electrolyte-supported cell (ESC) with a thick electrolyte, an anode-supported cell (ASC) with a thick anode and a cathode-supported cell (CSC) with a thick cathode.

Figure 5:
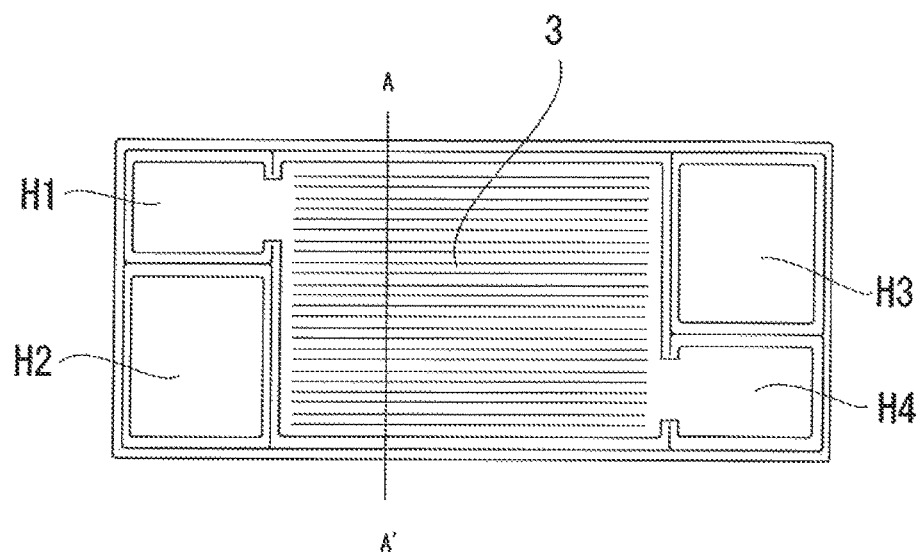
FIG. 5 is an exploded plan view of the solid oxide fuel cell of the present invention, illustrating the configuration thereof.
Figure 5:
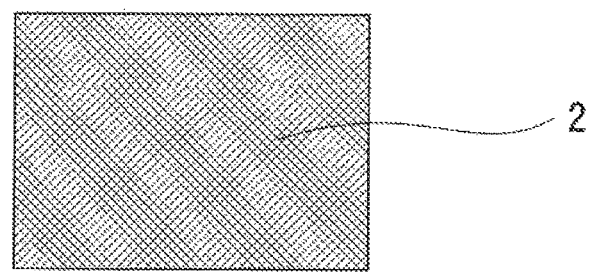
Figure 5:
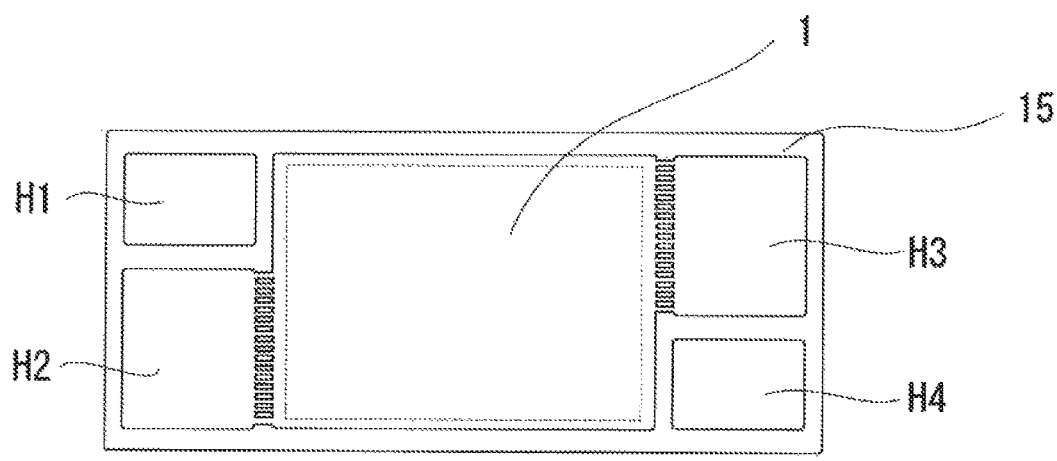

FIG. 5 illustrates an exploded view of the solid oxide fuel cell, illustrating the configuration thereof.

In the fuel cell unit 1, the porous metal support 14, a fuel electrode 11, a solid electrolyte layer 12 and the air electrode 13 are layered in the written order in the portion indicated by the dashed line in FIG. 5. The fuel cell unit 1 further comprises a frame 15 at an outer edge of the porous metal support 14.

On the opposite side of the fuel cell unit from the porous metal support, the current collection assisting layer and the current collector are layered in the written order. The current collector is fixed to a porous metal support 14 of an adjacent solid oxide fuel cell.

The frame 15 and the current collector 3 have an approximately rectangular outer shape with approximately the same length and width. The fuel cell unit 1 and the frame 15 are layered and fixed to the current collector 3 to constitute the solid oxide fuel cell C.

The current collector 3 has a corrugated transverse cross section at a center portion corresponding to the fuel cell unit 1. The corrugation extends in the longitudinal direction as illustrated in FIG. 5.

The protruded portions (i.e. ribs) of the corrugation of the current collector 3 are fixed to the current collection assisting layer 2 or the porous metal support 34 of the adjacent solid oxide fuel cell so that gas channels are formed in the recessed portions of the corrugation.

Figure 1:
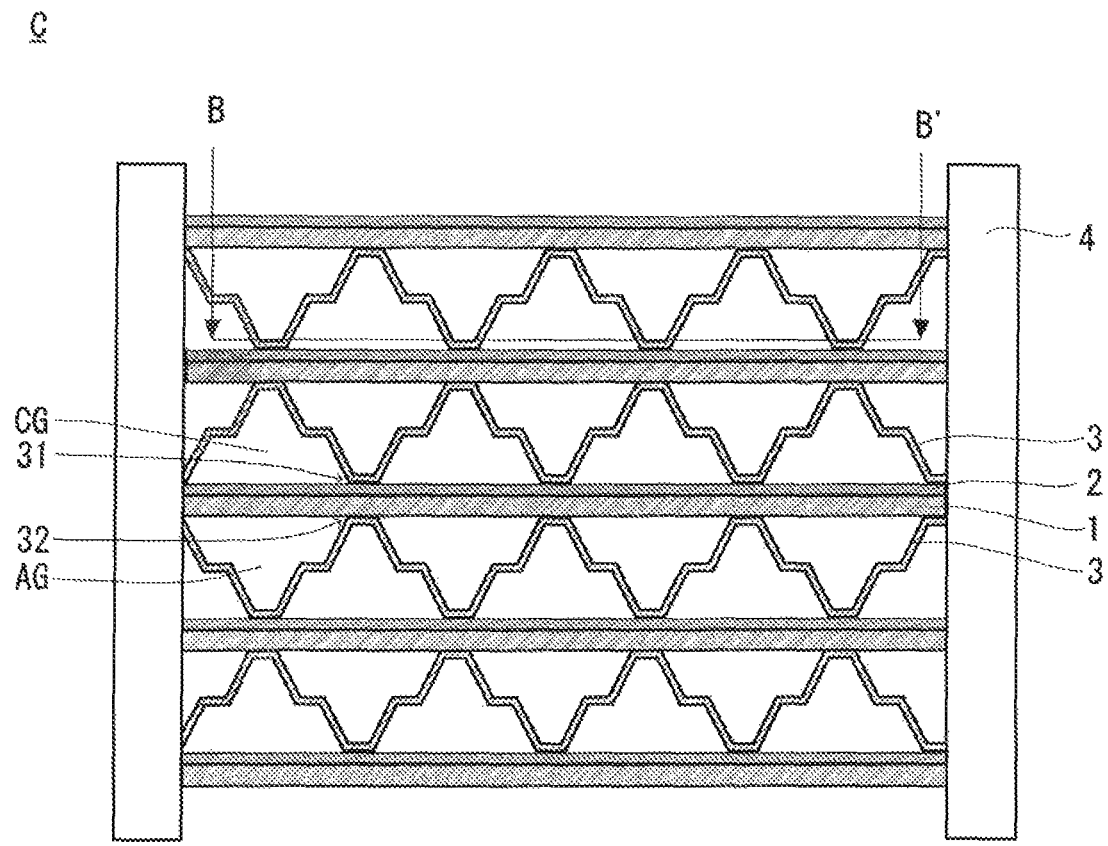
FIG. 1 is a cross-sectional view of a main part of a solid oxide fuel cell of the present invention.
Figure 2:
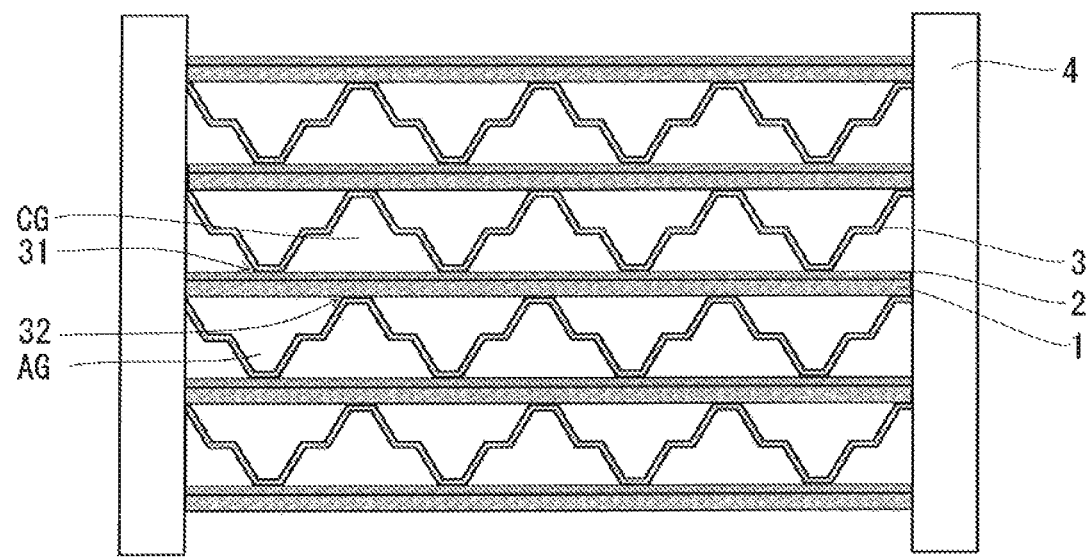
FIG. 2 is a cross-sectional view of a main part of another solid oxide fuel cell of the present invention.
Figure 3:
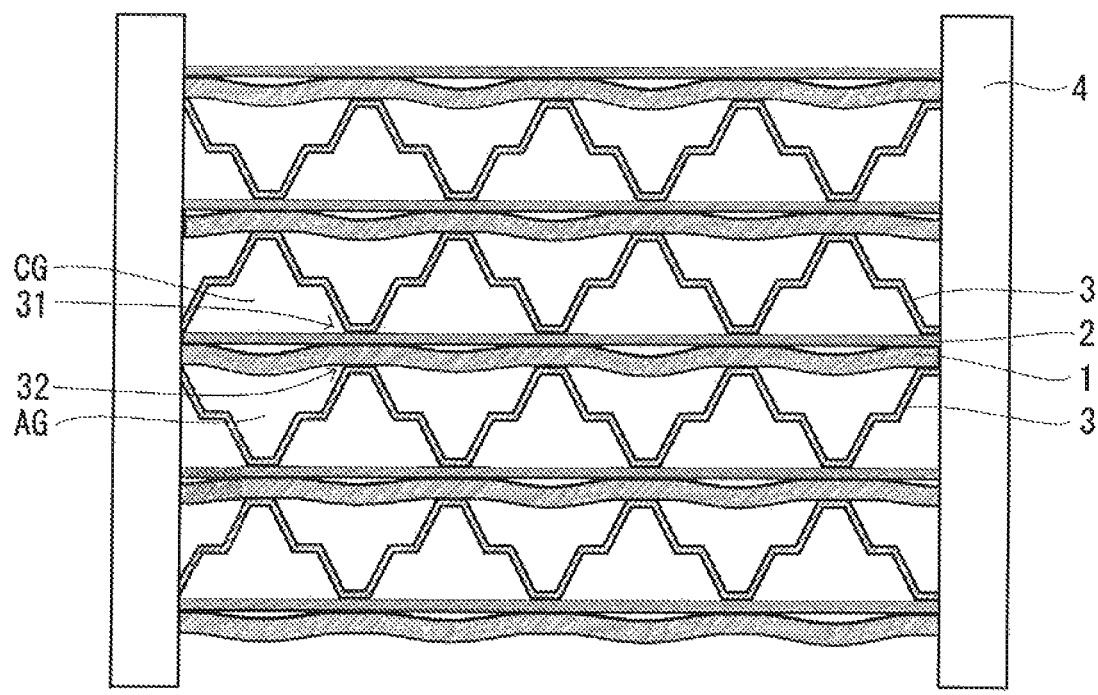
FIG. 3 illustrates a state in which a fuel cell unit curves to break a contact with a current collection assisting layer.

FIG. 1 is a cross-sectional view taken along the line A-A' in FIG. 5. In FIG. 1 the fuel cell unit, the current collection assisting layer, the current collectors, the fuel gas channels, air channels and the case are denoted respectively by 1, 2, 3, AG, CG and 4.

The fuel gas channels AG is defined and formed by the current collector on the fuel electrode of the fuel cell unit 1. The air channels CG are defined and formed by the current collector on the current collection assisting layer.

The air channels and the fuel gas channels extend in the same direction that is perpendicular to the fuel cell unit layering direction.

The current collector on the air electrode side is fixed to the current collection assisting layer at first fixing portions that extend in the air channel extending direction while the current collector on the fuel electrode side is fixed to the fuel electrode of the fuel cell unit at second fixing portions that extend in the fuel gas channel extending direction.

The current collection assisting layer 2 of the present invention has such flexural rigidity that is anisotropic in the plane direction of the fuel cell unit 1.

Figure 6:
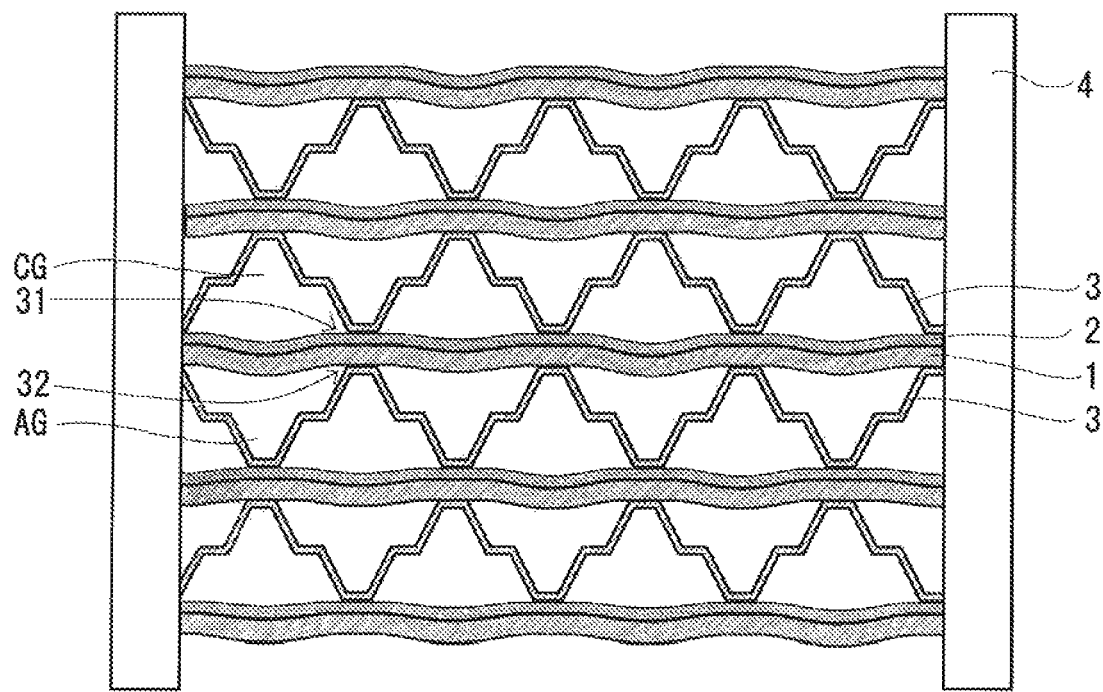
FIG. 6 illustrates a state in which the fuel cell unit of the solid oxide fuel cell of the present invention curves.

That is, the current collection assisting layer 2 has such flexural rigidity that is less in a direction perpendicular to the air channel extending direction than in the air channel extending direction. Therefore, even when the fuel cell unit 1 curves, the current collection assisting layer 2 can follow the flexural deformation of the fuel cell unit 1 as illustrated in FIG. 6. This can prevent separation of the current collection assisting layer 2 from the fuel cell unit 1.

That is, reducing the flexural rigidity of the current collection assisting layer 2 in a direction perpendicular to the air channel extending direction allows the flexural rigidity in this direction to be lower than the flexural rigidity of the fuel cell unit 1 without a decrease in electrical conductivity of the current collection assisting layer. Since this allows the current collection assisting layer 2 to curve according to a flexural deformation of the fuel cell unit 1, the contact between the current collection assisting layer 2 and the fuel cell unit 1 is not broken.

As a result, contact points between the current collection assisting layer 2 and the air electrode 13 are retained, and the Increase of the area specific resistance (ASR) of the solid oxide fuel cell C can be reduced by at least 25%.

It is preferred that the solid oxide fuel cell C of the present invention has a cross section in which current collectors 3 are symmetrically disposed across the fuel cell unit 1 and the current collection assisting layer 2 (hereinafter also referred to as a symmetrically layered current collector type) as illustrated in FIG. 1.

In the symmetrically layered current collector-type solid oxide fuel cell, first fixing portions of a current collector 3 on the air electrode side and second fixing portions of a current collector 3 on the fuel electrode side at least partially have overlapped areas in the layering direction of the fuel cell unit 1.

That is, since the fuel cell unit is held in the layering direction between the overlapped areas of the first fixing portions and the second fixing portions, the current collectors strongly restrict flexural deformation of the air channels in the extending direction. This can prevent separation of the first fixing portions and the second fixing portions. In addition, the fuel cell unit is not subjected to a shear force even when it is pressed by the two current collectors. This can prevent the fuel cell unit from cracking.

It is preferred that the ratio (S/L) of the flexural rigidity (S) in the direction perpendicular to the air channel extending direction to the flexural rigidity (L) in the direction of the air channels of the current collection assisting layer 2 ranges from 1/100 to 99/100 although it depends on the material of the current collection assisting layer 2 and the like.

When the ratio (S/L) is less than 1/100, it may be difficult to handle the current collection assisting layer in assembling the solid oxide fuel cell since the flexural rigidity is too low in the direction perpendicular to the air channel extending direction. Furthermore, the conductive path that is small in the direction perpendicular to the air channel extending direction may increase the electric resistance.

When the ratio (S/L) is greater than 99/100, the contact may be broken since the current collection assisting layer cannot follow flexural deformation of the fuel cell unit. In order to allow the current collection assisting layer to follow flexural deformation of the fuel cell unit, it is necessary to reduce the thickness of the entire fuel cell unit. However, this decreases the overall electrical conductivity of the current collection assisting layer.

As used in the present invention, the flexural rigidity of the current collection assisting layer 2 refers to the flexural rigidity per unit length in the air channel extending direction or in the direction perpendicular to the air channel extending direction and does not mean the flexural rigidity of each wire of the current collection assisting layer 2.

The flexural rigidity can be represented by ExI, where E is the Young's modulus, and I is the second moment of area.

Figure 7:
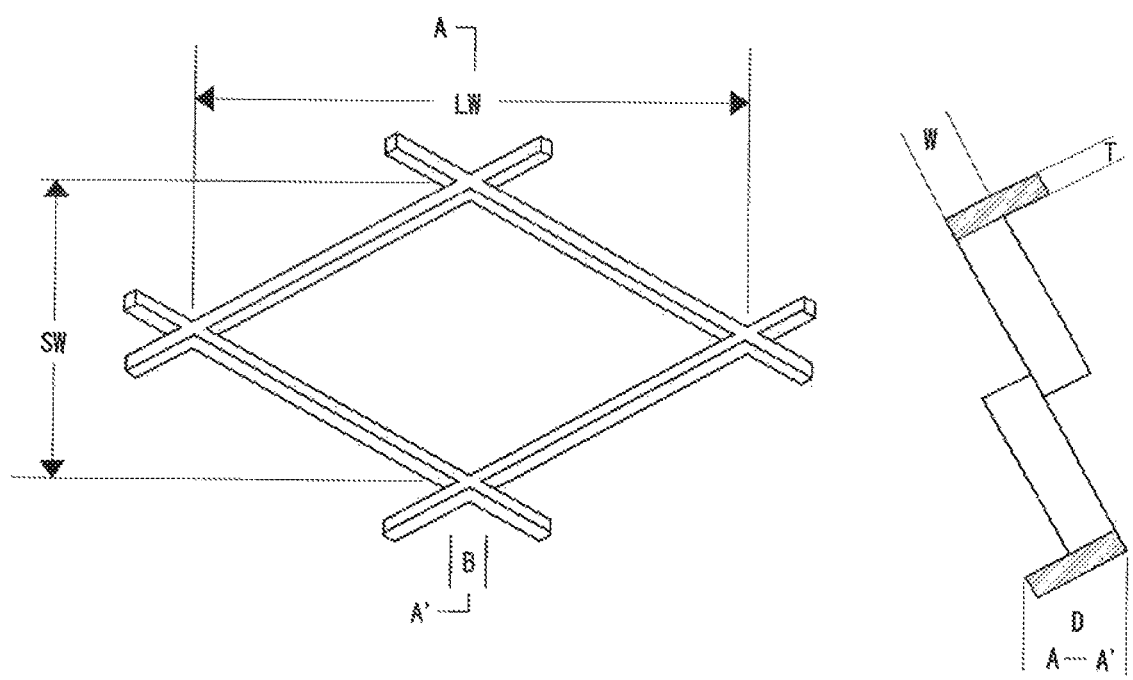
FIG. 7 illustrates a bonded portion of an expanded metal.

The Young's modulus is a value specific to the material of the current collection assisting layer 2. The second moment of area is determined by integrating the section of wires of the current collection assisting layer 2 in a unit length excluding sections at bonded portions B as illustrated in FIG. 7 where the wires intersect with each other.

That is, the flexural rigidity in the air channel extending direction is the product of the integrated value of the second moment of area of the wires sectioned in the direction perpendicular to the air channel extending direction in a unit length, and the Young's modulus. Further, the flexural rigidity in the direction perpendicular to the air channel extending direction is the product of the integrated value of the second moment of area of the wires sectioned in the air channel extending direction in a unit length, and the Young's modulus.

Next, the component of the solid oxide fuel cell C of the present invention will be described.

Fuel Electrode

Examples of materials that can be used for the fuel electrode 11 include a cermet of Ni and stabilized zirconia, $Sm_2O_3$ or $Gd_2O_3$-doped $CeO_2$, and the like.

Solid Electrolyte Layer

Examples of solid oxides that can be used for the solid electrolyte layer 12 include $Y_2O_3$ or $Se_2O_3$-doped stabilized zirconia, $Sm_2O_3$ or $Gd_2O_3$-doped $CeO_2$, lanthanum gallates having a perovskite structure such as $(La, Sr)(Gd, Mg)O_3$.

Air Electrode

Examples of materials that can be used for the air electrode 13 include oxide terminals having a perovskite structure such as $(Ls, Sr)CoO_3$ and $(Sm, Sr)CoO_3$.

Porous Metal Support.

The porous metal support 14 supports the fuel cell unit 1 from the fuel electrode side.

Materials that can be used for the porous metal support 14 include molded metal particles by pressing and the like.

Examples of such metal particles include metal particles of stainless steel, iron (Fe), nickel (Ni) copper (Cu), platinum (Pt), silver (Ag) and the like.

Current Collection Assisting Layer

Examples of the current collection assisting layer 2 include expanded metals, punching metals, metal meshes and the like of metals such as stainless steel, nickel (Ni) or chromium (Cr)-based alloys, platinum (Pt) and silver (Ag).

Examples of methods of providing anisotropic property to the flexural rigidity of the current collection assisting layer 2 include a method of forming a mesh with opening size that is different between the long way (LW) direction and the short way (SW) direction, a method of changing the integrated value of the second moment of area between mutually orthogonal wires, a method of changing the wire width between mutually orthogonal wires, a method of changing the wire height between mutually orthogonal wires, a method of changing the number of wires between mutually orthogonal wires, a method of using two or more types of wires with different Young's modulus, and the like.

Current Collector

Examples of the current collector 3 include a corrugated plate that is formed from a flat metal plate of stainless steel or a nickel (Ni) or chromium (Cr)-based alloy by press-working.

It is preferred that the current collector comprises a bent portion for absorbing deformation between the first fixing portions fixed to the current collection assisting layer and the second fixing portions fixed to an adjacent fuel cell unit.

The first fixing portions 31, which fixed the current collector 3 to the current collection assisting layer 2, and the second fixing portions 32, which fixed the current collector 3 to the porous metal support 14, can be fixed by pressure welding, bonding, welding or the like. It is preferred that they are fixed by welding.

When the current collector 3 is fixed to the current collection assisting layer 2 and the porous metal support 14 by welding so that a metal joined portion is formed, a conductive path is formed between the current collector 3 and the current collection assisting layer 2 as well as the porous metal support 14. This can reduce the resistance and improve the power generation efficiency.

In the present invention, a metal joined portion refers to a portion in which metals are directly joined to each other without intervention of an oxide film.

Contacting Material Layer

The solid oxide fuel cell of the present invention may comprise a contacting material layer between the air electrode of the fuel cell unit and the current collection assisting layer.

The contacting material layer is provided to improve the joining power between the air electrode 13 of the fuel cell unit 1 and the current collection assisting layer 2. A firm joint can be made by overlaying the current collection assisting layer 2 onto the contacting material having flexibility e.g. in a state of a paste and sintering them along with the air electrode 13, since the wires of fee current collection assisting layer bite into the contacting material layer.

Materials that can be used for the contacting material layer include paste of platinum (Pt) or silver (Ag) and paste of an oxide having a perovskite structure such as (Ls Sr)CoO$_3$ or (Sm, Sr)CoO$_3$ as well as the metal oxide of the solid oxide layer. They can be used alone or in combination of two or more.

EXAMPLES

Hereinafter, the present invention will be described in detail with embodiments. However, the present invention is not limited to the following embodiments.

First Embodiment

Figure 8:
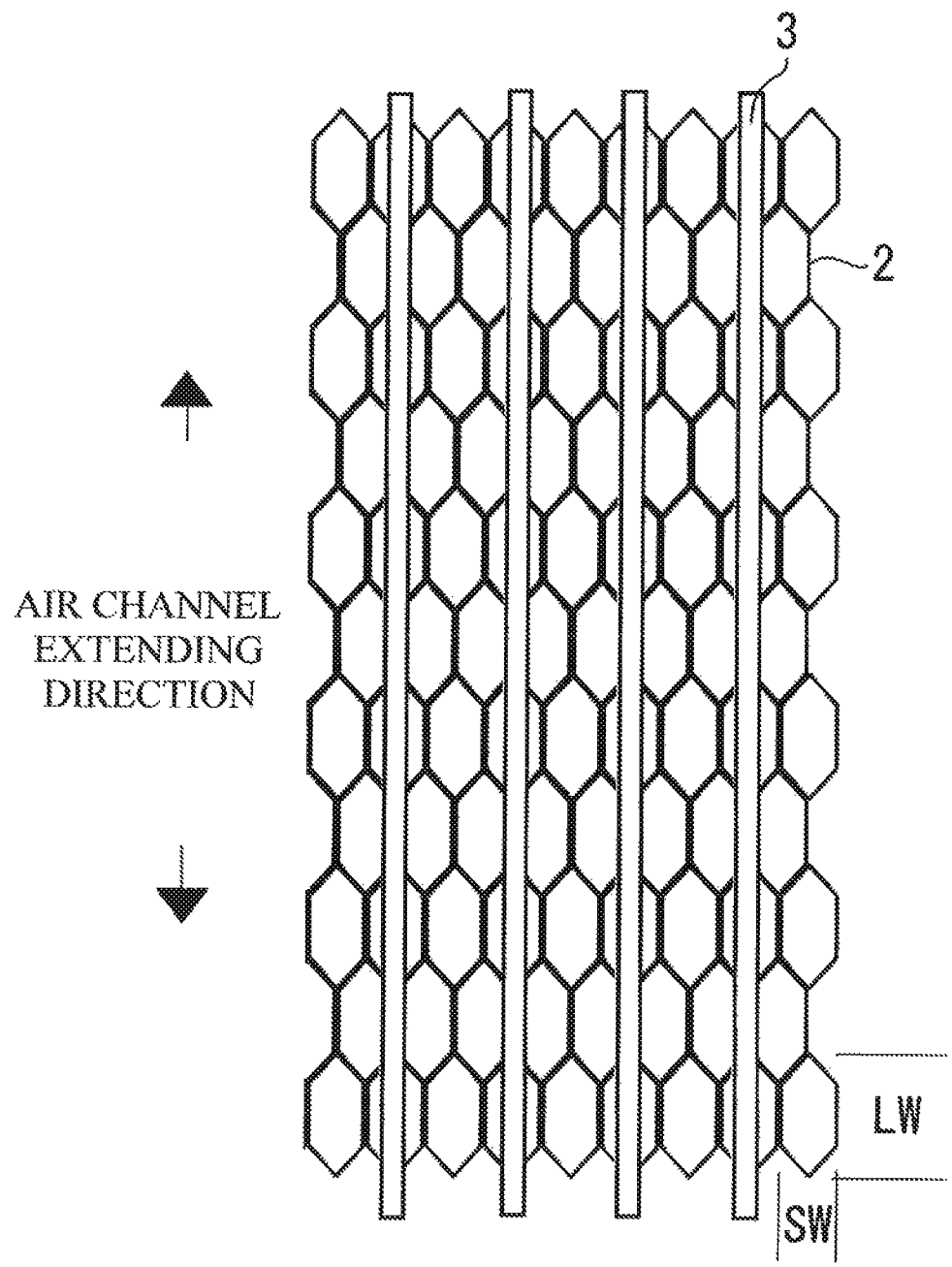
FIG. 8 illustrates the arrangement of a current collection assisting layer with respect to air channels according to a first embodiment.

This embodiment is an example in which an expanded metal is used as the current collection assisting layer 2. FIG. 8 is a view from the current collector side taken along the line B-B' in FIG. 1.

The expanded metal is a diamond or honeycomb-shaped mesh formed by cutting a metal plate in a staggered pattern and expanding it. The expanded metal has such flexural rigidity that is lower in the short way (SW) direction of the mesh than in the long way (LW) direction of the mesh.

When the long way (LW) direction of the mesh of the expanded metal is parallel to the air channel extending direction, the current collection assisting layer has such flexural rigidity that is lower in the direction perpendicular to the air channel extending direction than in the air channel extending direction.

Therefore, the current collection assisting layer 2 can follow a flexural deformation of the fuel cell unit 1, and separation of the current collection assisting layer 2 from the fuel cell unit 1 can be prevented.

Second Embodiment

Figure 9:
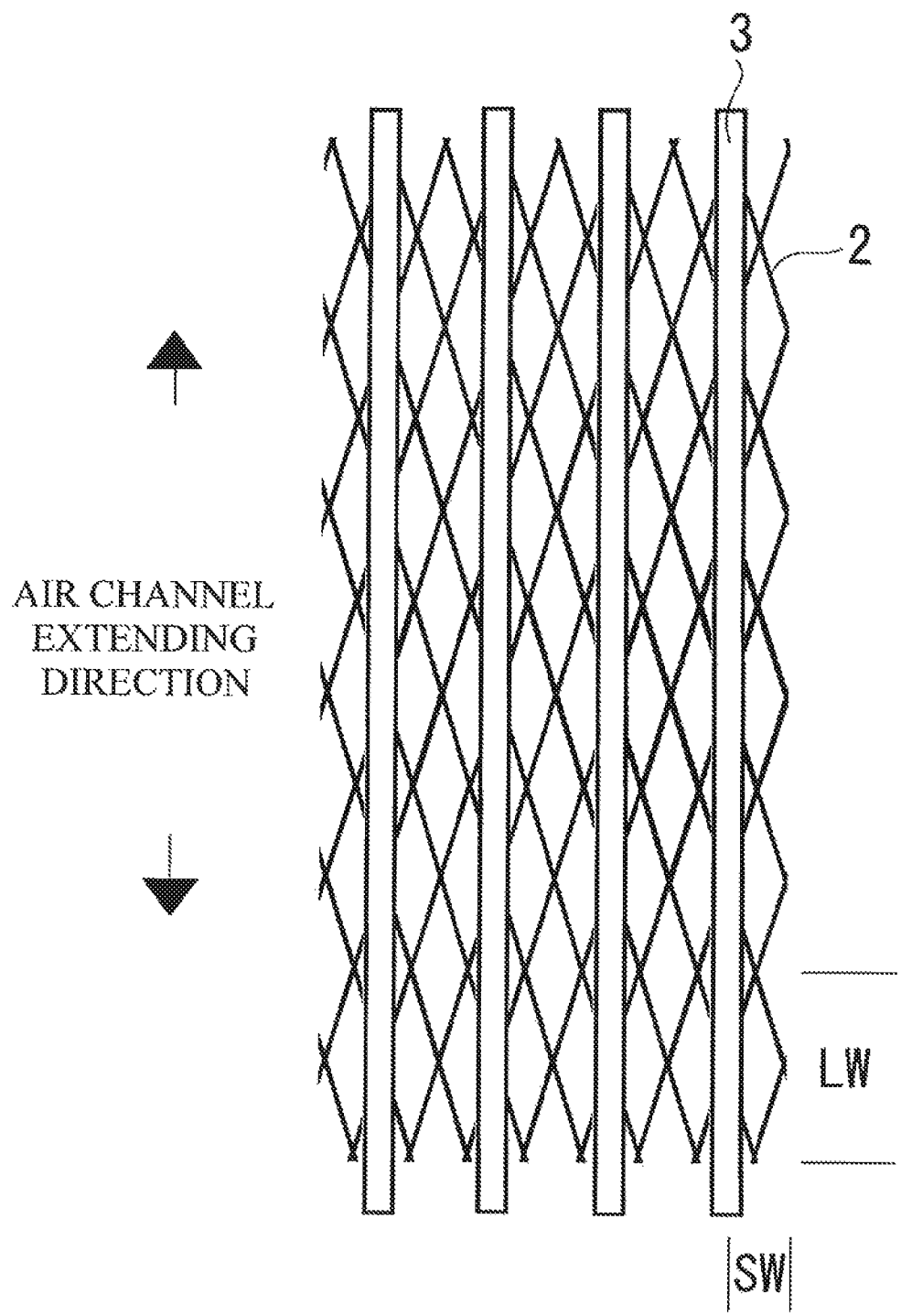
FIG. 9 illustrates the arrangement of a current collection assisting layer with respect to air channels according to a second embodiment.

FIG. 9 is a schematic view of this embodiment. FIG. 9 is a view from the current collector side taken along the line B-B' in FIG. 1.

This embodiment is an example in which a metal mesh is used as the current collection assisting layer. The crossing angle of wires of the metal mesh is wider in the direction perpendicular to the direction of oxygen-containing gas channels than in the direction of the oxygen-containing gas channels. That is, the long way (LW) direction of the mesh is parallel to the oxygen-containing gas channel direction.

Since the long way (LW) direction of the metal mesh is parallel to the air channel extending direction, the current collection assisting layer has such flexural rigidity that is lower in the direction perpendicular to the air channel extending direction than in the air channel extending direction.

Therefore, the current collection assisting layer can follow a flexural deformation of the fuel cell unit, and separation of the current collection assisting layer from the fuel cell unit can be prevented.

Third Embodiment

Figure 10:
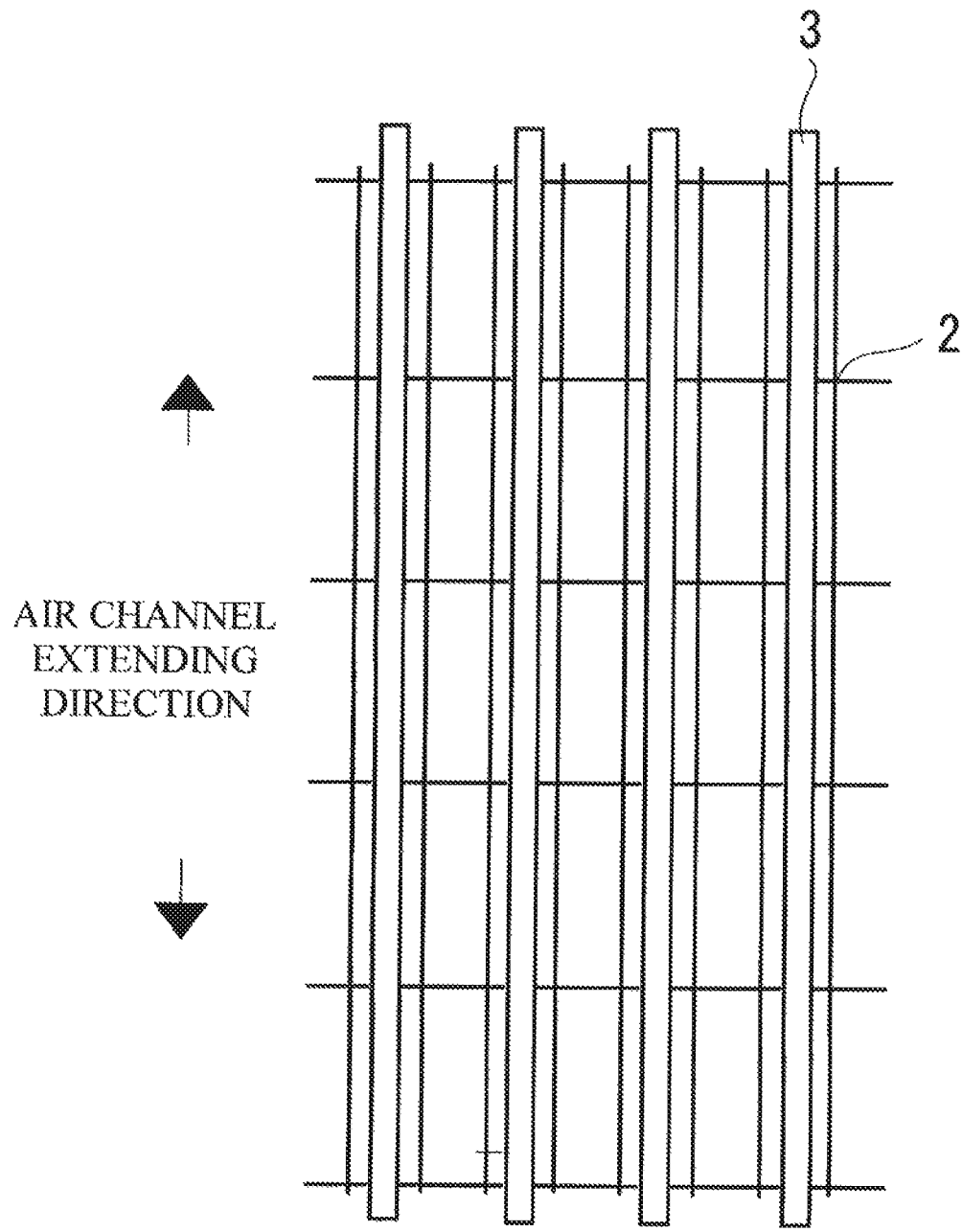
FIG. 10 illustrates the arrangement of a current collection assisting layer with respect to air channels according to a third embodiment.

FIG. 10 is a schematic view of this embodiment. FIG. 10 is a view from the current collector side taken along the line B-B' in FIG. 1.

This embodiment is an example in which a metal mesh is used as the current collection assisting layer.

The metal mesh is configured such that wires are orthogonally crossed with each other in the air channel extending direction and in the direction perpendicular to the air channel extending direction, and the number of wires in the air channel extending direction is larger than the number of wires in the perpendicular direction.

Since the number of wires in the direction perpendicular to the air channel extending direction is smaller, the current collection assisting layer has such flexural rigidity that is lower in the direction perpendicular to the air channel extending direction than in the air channel extending direction.

Therefore, the current collection assisting layer can follow a flexural deformation of the fuel cell unit, and separation of the current collection assisting layer from the fuel cell unit can be prevented.

Fourth Embodiment

Figure 11:
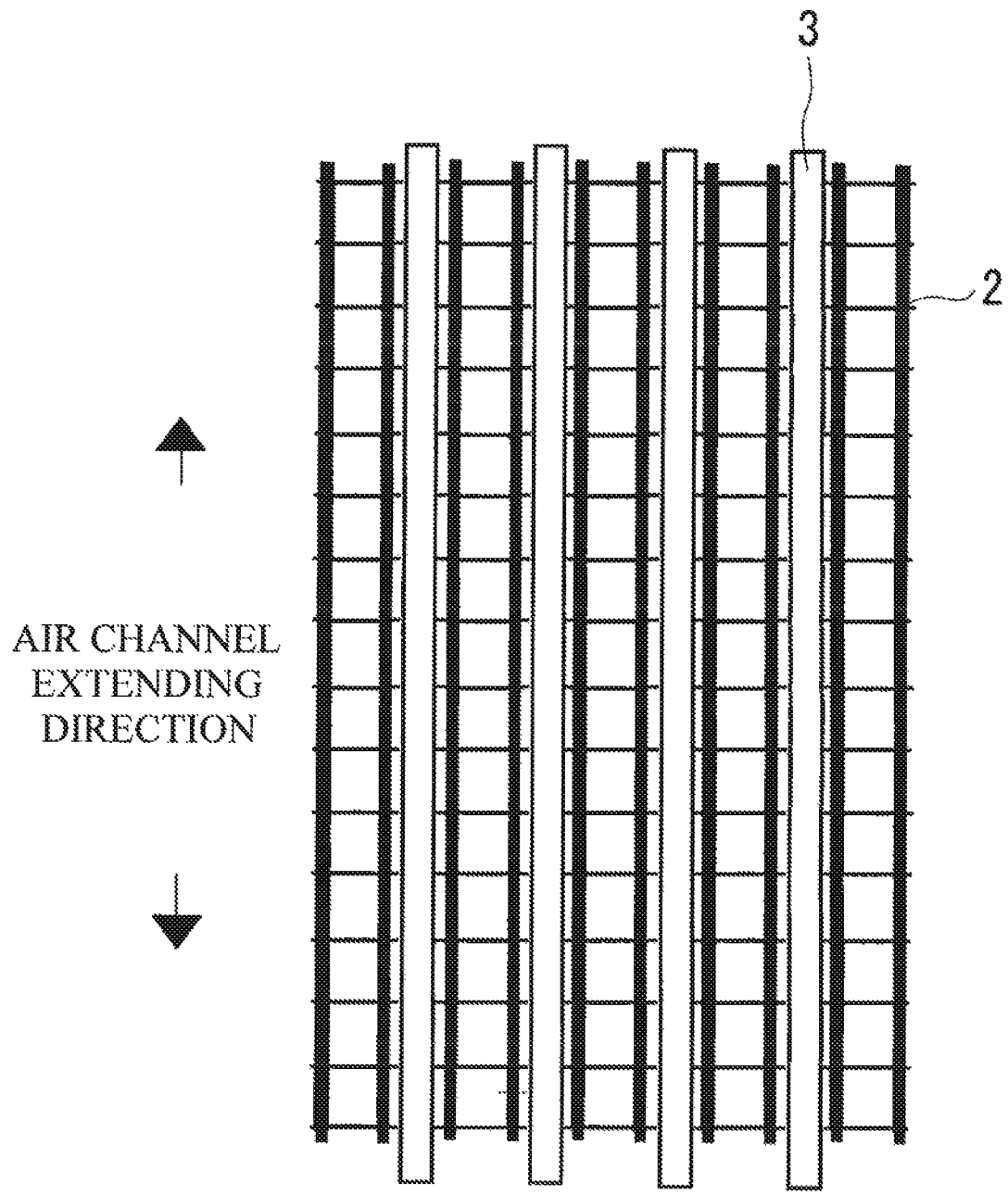
FIG. 11 illustrates the arrangement of a current collection assisting layer with respect to air channels according to a fourth embodiment.

FIG. 11 is a schematic view of this embodiment. FIG. 11 is a view from the current collector side taken along the line B-B' in FIG. 1.

This embodiment is an example in which a metal mesh is used as the current collection assisting layer.

The metal mesh is configured such that wires are orthogonally crossed with each other in the air channel extending direction and in the perpendicular direction thereof, and the second moment of area of the wires extending in the air channel extending direction is greater than the second moment of area of the wires extending in the direction perpendicular to the air channel extending direction.

Since the second moment of area of the wires extending in the direction perpendicular to the air channel extending direction is lower, the current collection assisting layer has such flexural rigidity that is lower in the direction perpendicular to the air channel extending direction than in the air channel extending direction. Therefore, the current collection assisting layer can follow a flexural deformation of the fuel cell unit, and separation of the current collection assisting layer from the fuel cell unit can be prevented.

REFERENCE SINGS LIST

C Solid oxide fuel cell
1 Fuel cell unit
11 Fuel electrode
12 Solid electrolyte layer
13 Air electrode
14 Porous metal support
15 Frame
2 Current collection assisting layer
3 Current collector
31 First fixing portion
32 Second fixing portion
4 Case
AG Fuel gas channel
CG Oxygen-containing gas channel
H1 to H4 Manifold

The invention claimed is:

1. A solid oxide fuel cell, comprising:
   a fuel cell unit comprising a fuel electrode, a solid electrolyte and an air electrode that are layered in the written order;
   a current collection assisting layer that is layered on an air electrode side of the fuel cell unit;
   air channels disposed on the air electrode side; and
   fuel gas channels disposed on a fuel electrode side,
      wherein the air channels and the fuel gas channels are defined and formed by a current collector on the current collection assisting layer and a current collector on the fuel electrode side of the fuel cell unit, respectively, and the air channels and the fuel gas channels extend in a same direction that is perpendicular to a fuel cell unit layering direction,
   the current collector on the air electrode side is fixed to the current collection assisting layer at first fixing portions that extend in an air channel extending direction, and the current collector on the fuel electrode side is fixed to the fuel electrode side of the fuel cell unit at second fixing portions that extend in a fuel gas channel extending direction, and
   the current collection assisting layer has a major surface extending along a plane and has such flexural rigidity that is lower in a first direction than in the air channel extending direction, the first direction extending along the plane and being perpendicular to the air channel extending direction.

2. The solid oxide fuel cell according to claim 1, wherein the first fixing portions and the second fixing portions have overlapped areas in the layering direction of the fuel cell unit.

3. The solid oxide fuel cell according to claim 1, wherein a ratio (S/L) of a flexural rigidity (S) of the current collection assisting layer in the first direction perpendicular to the air channel extending direction to a flexural rigidity (L) of the current collection assisting layer in the air channel extending direction ranges from 1/100 to 99/100.

4. The solid oxide fuel cell according to claim 2, wherein a ratio (S/L) of a flexural rigidity (S) of the current collection assisting layer in the first direction perpendicular to the air channel extending direction to a flexural rigidity (L) of the current collection assisting layer in the air channel extending direction ranges from 1/100 to 99/100.

5. The solid oxide fuel cell according to claim 1,
   wherein the current collection assisting layer comprises a metal mesh of wires that are orthogonally crossed with each other in the air channel extending direction and the first direction perpendicular to the air channel extending direction, and
   a second moment of area of wires in the air channel extending direction is greater than a second moment of area of wires in the first direction perpendicular to the air channel extending direction.

6. The solid oxide fuel cell according to claim 2,
   wherein the current collection assisting layer comprises a metal mesh of wires that are orthogonally crossed with each other in the air channel extending direction and the first direction perpendicular to the air channel extending direction, and
   a second moment of area of wires in the air channel extending direction is greater than a second moment of area of wires in the first direction perpendicular to the air channel extending direction.

7. The solid oxide fuel cell according to claim 1,
   wherein the current collection assisting layer comprises a metal mesh of wires that are orthogonally crossed with each other in the air channel extending direction and the first direction perpendicular to the air channel extending direction, and
   the number of wires in the air channel extending direction is larger than the number of wires in the first direction perpendicular to the air channel extending direction.

8. The solid oxide fuel cell according to claim 2,
   wherein the current collection assisting layer comprises a metal mesh of wires that are orthogonally crossed with each other in the air channel extending direction and the first direction perpendicular to the air channel extending direction, and
   the number of wires in the air channel extending direction is larger than the number of wires in the first direction perpendicular to the air channel extending direction.

9. The solid oxide fuel cell according to claim 1,
   wherein the current collection assisting layer comprises an expanded metal, a metal mesh or a punching metal, and
   the current collection assisting layer has such opening size that is smaller in the first direction perpendicular to the air channel extending direction than in the air channel extending direction.

10. The solid oxide fuel cell according to claim 2,
    wherein the current collection assisting layer comprises an expanded metal, a metal mesh or a punching metal, and
    the current collection assisting layer has such opening size that is smaller in the first direction perpendicular to the air channel extending direction than in the air channel extending direction.

11. The solid oxide fuel cell according to claim 1, wherein the first fixing portions are welded to the current collection assisting layer.

12. The solid oxide fuel cell according to claim 2, wherein the first fixing portions are welded to the current collection assisting layer.

13. The solid oxide fuel cell according to claim 1, wherein the fuel cell unit comprises a porous metal support that is layered on the fuel electrode.

14. The solid oxide fuel cell according to claim 2, wherein the fuel cell unit comprises a porous metal support that is layered on the fuel electrode.

15. The solid oxide fuel cell according to claim 2, wherein the first direction perpendicular to the air channel extending direction, in which the flexural rigidity of the current collection assisting layer is lower than in the air channel extending direction, is perpendicular to the fuel cell unit layering direction.

16. A solid oxide fuel cell, comprising:
    a fuel cell unit comprising a fuel electrode, a solid electrolyte and an air electrode that are layered in the written order;
    a current collection assisting layer that is layered on an air electrode side of the fuel cell unit;
    air channels disposed on the air electrode side; and
    fuel gas channels disposed on a fuel electrode side,
       wherein the air channels and the fuel gas channels are defined and formed by a current collector on the current collection assisting layer and a current collector on the fuel electrode side of the fuel cell unit, respectively, and the air channels and the fuel gas channels extend in a same direction that is perpendicular to a fuel cell unit layering direction, the current collector on the air electrode side is fixed to the current collection assisting layer at first fixing portions that extend in an air channel extending direction, and the current collector on the fuel electrode side is fixed to the fuel electrode side of the fuel cell unit at second fixing portions that extend in a fuel gas channel extending direction, and the current collection assisting layer has such flexural rigidity that is lower in a direction perpendicular to the air channel extending direction than in the air channel extending direction, wherein the direction perpendicular to the air channel extending direction, in which the flexural rigidity of the current collection assisting layer is lower than in the air channel extending direction, is perpendicular to the fuel cell unit layering direction.

* * * * *